Fig. 1

Oct. 26, 1954         J. B. ARMITAGE ET AL         2,692,518
                         MACHINE TOOL

Filed Aug. 25, 1948                              7 Sheets-Sheet 3

Fig. 3

INVENTORS
Joseph B. Armitage
BY  John R. Lukey

W. D. O'Connor
           Attorney

Oct. 26, 1954  J. B. ARMITAGE ET AL  2,692,518
MACHINE TOOL
Filed Aug. 25, 1948  7 Sheets-Sheet 7

INVENTORS
Joseph B. Armitage,
John B. Lukey
BY
W. D. O'Connor
Attorney

Patented Oct. 26, 1954

2,692,518

UNITED STATES PATENT OFFICE 2,692,518

MACHINE TOOL

Joseph B. Armitage, Wauwatosa, and John B. Lukey, West Allis, Wis., assignors to Kearney & Trecker Corporation, West Allis, Wis., a corporation of Wisconsin Application August 25, 1948, Serial No. 46,006

9 Claims. (Cl. 77—3)

This invention relates generally to machine tools and more particularly to an improved transmission and control mechanism for a precision boring machine.

A general object of the invention is to provide an improved machine tool of the precision jig boring type.

Another object of the invention is to provide an improved power transmitting mechanism for actuating movable elements of a machine tool.

Another object is to provide improved precision control means for accurately positioning a movable part of a machine tool.

Another object is to provide improved means to actuate an indicator in response to movement of a machine tool element at the end of its path of movement in a feeding direction.

Another object is to provide an improved tripping device for automatically stopping the feeding movement of a movable support at a predetermined position.

Another object is to provide a precision positioning mechanism for locating a movable support of a machine tool successively at a plurality of predetermined positions with a supplemental tripping mechanism for automatically stopping feeding movement of the support in either direction at an approximately predetermined position.

A further object is to provide an improved tripping element that may be rapidly but accurately adjusted relative to a movable support of a machine tool to the desired position for actuating a tripping mechanism and a sensitive indicating device as the support travels in its path of movement.

A still further object is to provide an improved stop nut tripping element in which the diameter of the threaded portion is adjustable for varying its engagement with the mating screw.

According to this invention, a precision boring machine of the horizontal spindle type is provided with an improved driving mechanism including speed changing apparatus which delivers power to a vertical shaft leading to the spindle head and thence to the horizontal spindle through a flexible coupling disposed to absorb shock and vibration in the transmission. The vertical shaft transmitting power to the spindle head also transmits power to a second speed changing transmission for controlling the movement of the saddle. The second transmission is connected to the shaft through a pair of one-way clutches, arranged to drive in opposite directions, in such manner that the shaft will rotate in one direction only, regardless of the direction in which the vertical shaft leading to the spindle is rotating. This arrangement permits reversal of the spindle without affecting saddle movement. The invention also includes improved means for indicating accurately the arrival of the movable part at a predetermined terminal position in its path of movement. For this purpose, the movable part is provided with a plurality of tripping elements disposed to engage selectively with an indicator actuating means that functions to operate a sensitive indicating device such as a dial indicator. For controlling power movement of the machine tool part, a trip mechanism is provided, including a tripping bar which is actuated by the tripping elements before they come in contact with the indicator actuating means. The trip mechanism is preferably arranged to stop the part automatically, just prior to its arriving at the predetermined position, the part then being adjusted manually precisely to the predetermined position as indicated accurately by the dial indicator.

The foregoing and other objects of the invention which will become more fully apparent from the following detailed description, may be achieved through embodiment of the invention in structures such as the exemplifying apparatus depicted in and herein described in connection with the accompanying drawings, in which:

Fig. 7 is a detailed view in vertical transverse section of the stop nut mechanism and trip bar, taken on the plane represented by the line 7—7 in Fig. 6;

Fig. 8 is an enlarged detailed fragmentary view in right side elevation of the ratchet device shown in front elevation in Fig. 6;

Fig. 9 is a detailed view of the stop nut with its cooperating sleeve shown engaging the mating screw and taken in horizontal longitudinal section along the plane represented by the line 9—9 in Fig. 6;

Fig. 10 is a detailed view in side elevation of the nut shown in Fig. 9 but without its cooperating sleeve;

Fig. 11 is an enlarged detailed fragmentary plan view of a portion of the indicator actuating mechanism taken at the end adjacent to the sensitive indicating device; and, Fig. 12 is a detailed view of the indicator actuating mechanism, taken in vertical section along the plane represented by the line 12—12 in Fig. 11.

The particular machine tool herein set forth to illustrate a practical embodiment of the various features of this invention, is a precision jig boring machine of the horizontal spindle type.

Figure 1:
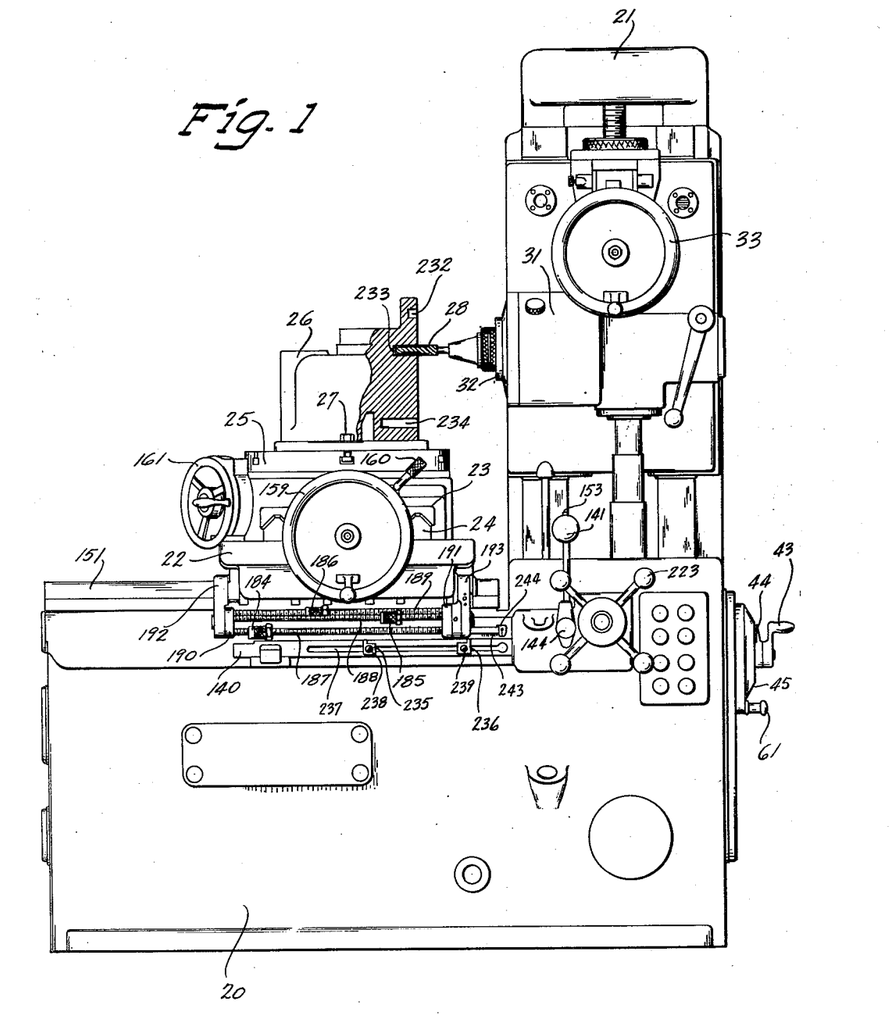
Figure 1 is a view in front elevation of a precision milling and boring machine embodying the novel features of the present invention.

Referring more specifically to the drawing and particularly to Fig. 1 thereof, the boring machine there shown comprises essentially a hollow base or bed 20 carrying an integrally formed upstanding hollow column 21, the combined structure constituting the frame of the machine and the housing for the driving mechanism. As shown, the base 20 projects outwardly from the column 21 and has slidably mounted on its upper surface, a saddle 22 for horizontal feeding movement toward and from the column 21. The saddle 22 supports a carriage 23 slidable on ways 24 fixed to the saddle for transverse horizontal adjustment, and the carriage, in turn, supports a rotary table 25 on which a workpiece 26 is mounted. Any workpiece within the capacity of the machine, such as the piece 26 illustrated in Fig. 1, may be supported on the table 25 and secured thereto by T-bolts 27 or other appropriate clamps in position to be engaged by a boring tool 28 rotatably carried by the column 21. A spindle head 31 is slidably mounted for vertical movement along the column 21 and carries a horizontally positioned tool supporting spindle 32 in which the boring tool 28 is mounted in cooperating relationship with the workpiece 26 on the rotary table 25. Vertical movement of the spindle head 31 is obtained by manipulating a hand wheel 33 that functions to raise or lower the spindle head to any desired position.

Figure 2:
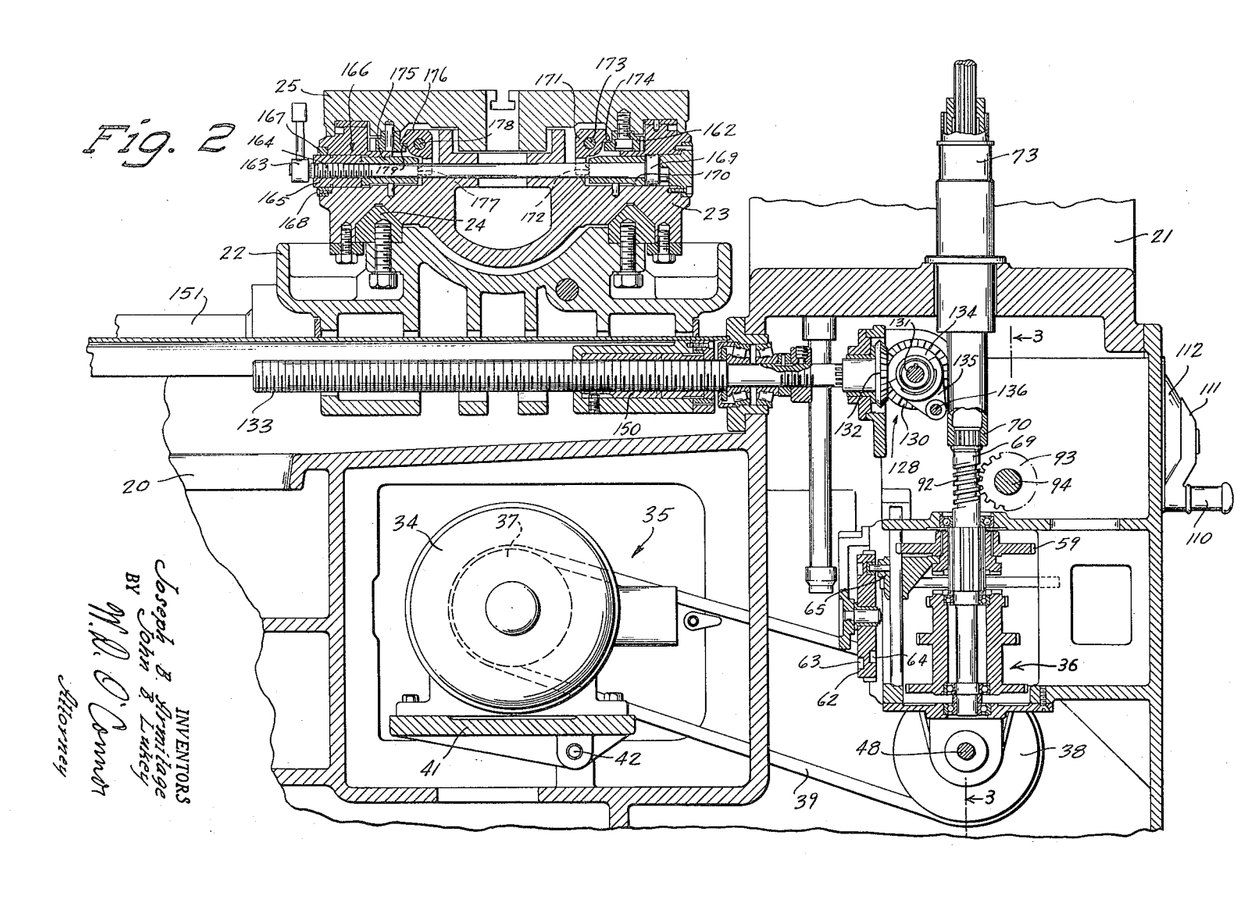
Fig. 2 is a fragmentary view in vertical section through the machine bed and work supporting table as viewed from the front of the machine.
Figure 3:
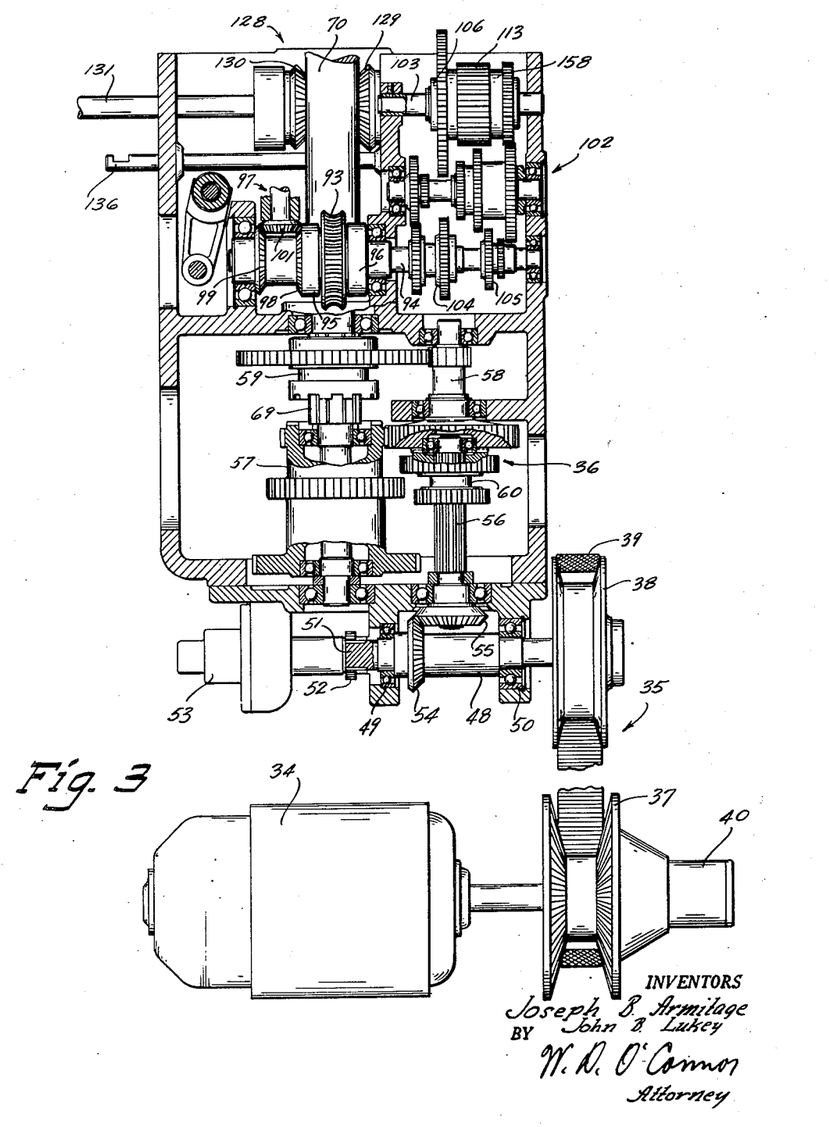
Fig. 3 is a detail view of the power transmission mechanism taken partially in elevation and partially in vertical section on the plane represented by the line 3—3 in Fig. 2.

Power for driving the spindle 32 and for effecting feeding movement of the saddle 22 is derived from an electric motor 34 mounted within the hollow base 20 of the machine, as shown in Figs. 2 and 3. From the motor 34, power is transmitted through an infinitely variable belt drive speed change mechanism 35 and a fixed step change gear mechanism 36 within the base of the machine. The infinitely variable speed range is obtained through an expansible pulley 37 mounted on the motor shaft and connected to drive a rigid pulley 38 by a belt 39. The sides of the pulley 37 are forced together by a spring (not shown) located in a housing 40 while the pulley is rendered expansibly adjustable by selectively positioning the motor 34. As illustrated in Fig. 2, for such a purpose the motor 34 is carried by a platform 41 which is mounted for oscillation about a pivot pin 42 supported by the structure of the bed 20.

Figure 4:
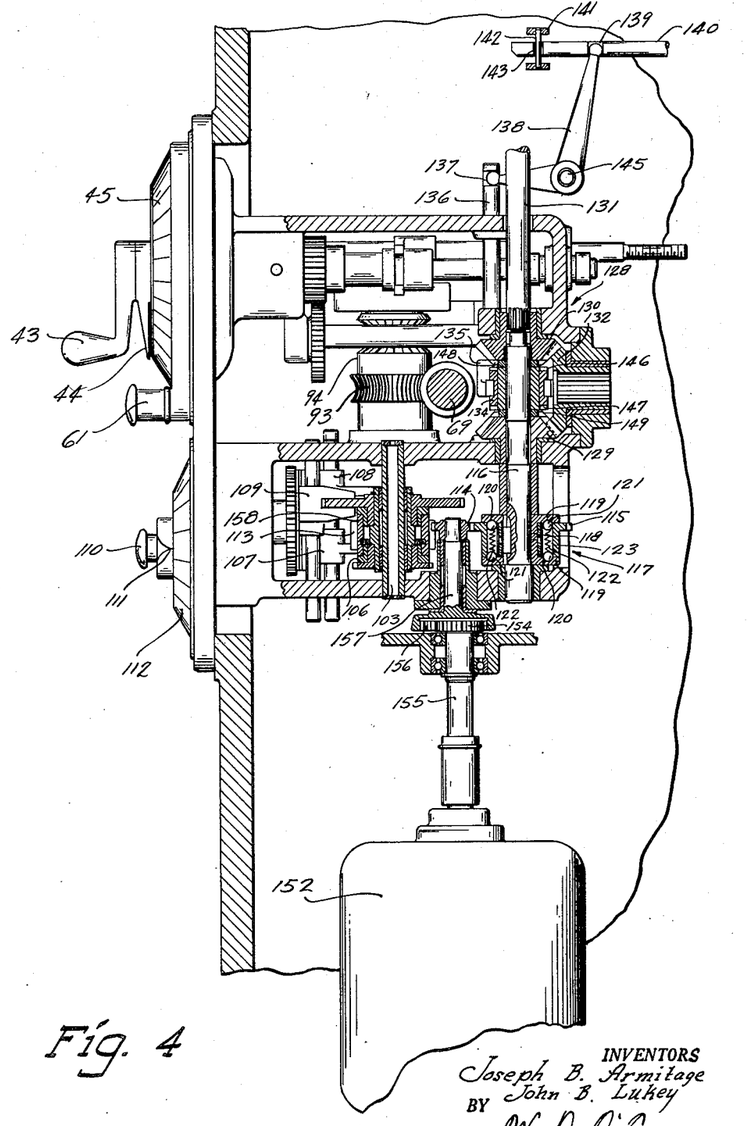
Fig. 4 is another detail view largely in horizontal section showing the saddle reversing mechanism and overload clutch.

The motor 34 is actuated in its arcuate movement by manipulating a hand crank 43 shown in Figs. 1 and 4. A pointer 44 cooperates with the hand crank 43 to indicate the speed corresponding to the position of the hand crank on a graduated dial 45. When the motor 34 is moved in a direction away from the rigid pulley 38, the tension on the belt 39 is increased, causing the expansible pulley 37 to expand and permit the belt 39 to operate closer to the center thereof, with a reduction in the pitch diameter resulting in a slower belt speed and a corresponding reduction in the speed of the rigid pulley 38. When the motor 34 is moved to decrease the distance between centers of the two pulleys 37 and 38, tension on the belt 39 is eased, permitting the sides of the expansible pulley 37 to contract; as the belt is urged outwardly, the effective pitch diameter of the pulley 37 is increased with a consequent increase in speed of the rigid pulley 38.

The rigid pulley 38 is fixed to one end of a drive shaft 48, as best shown in Fig. 3, which is rotatably supported by a pair of bearings 49 and 50. Attached to the other end of the shaft 48 is a spur gear 51 which engages a cooperating spur gear 52 for driving an oil pump 53 to supply lubrication to the machine. A bevel gear 54 keyed to the drive shaft 48, engages a complementary bevel gear 55 keyed to a splined shaft 56 from which the power is transmitted to the fixed step transmission 36. The fixed step transmission includes two fixed gear couplets 57 and 58 and two slidable gear couplets 59 and 60 which provide six speeds. The slidable gear couplets are shifted by manipulating a hand crank 61, shown in Fig. 4, which is operably connected to rotate a cam plate 62, as illustrated in Fig. 2. The cam plate 62 is provided with two cam grooves 63 and 64, one on each of its faces. Each cam groove engages a shifting fork, one of which is shown, and referred to by the numeral 65, it being disposed to shift the gear couplet 59.

Manipulation of the hand crank 61 actuates the graduated dial 45 which cooperates with the pointer 44 to indicate the speed of the spindle 32. The pointer 44 is arranged to move through a predetermined arc as the hand crank 43 is manipulated to selectively adjust the position of motor 34 and the expansible pulley 37; at the same time, the dial 45 is actuated with every shift of the fixed step transmission 36 to bring a different sector of the dial, representing a new speed range, within the area of movement of the pointer 44. Thus, the pointer 44 and the graduated dial 45, in cooperating relationship, simultaneously function to indicate the speed of the spindle 32 as determined from the adjusted setting of the fixed step transmission 36 and the pulley 37.

Figure 5:
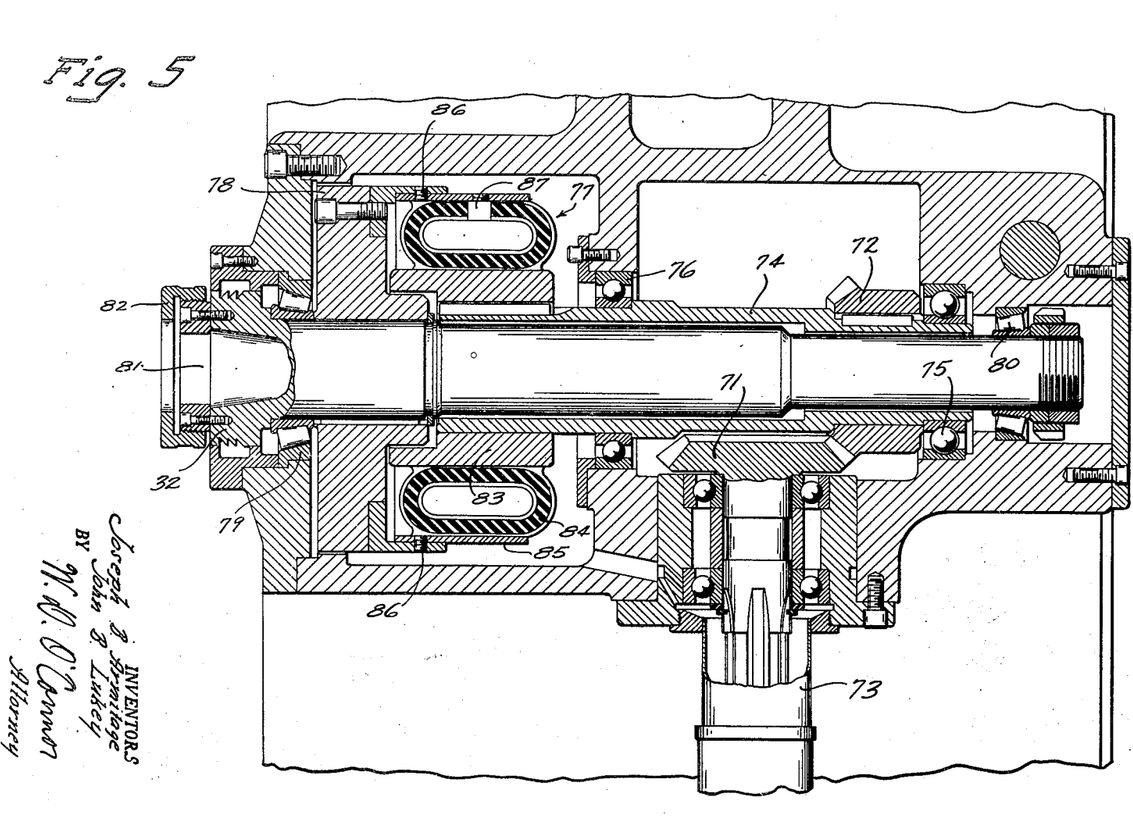
Fig. 5 is an enlarged fragmentary detail view of the spindle head taken in vertical section.

From the fixed step transmission 36, power is transmitted to the spindle head 31 by a vertical shaft 69 connected with a sleeve 70 having splined connection with the downwardly extending shaft of a bevel pinion 71 rotatably journalled in the head, which engages a complementary bevel gear 72, as illustrated in Fig. 5. The splined connection between the shaft of the pinion 71 and the sleeve 70 allows these two elements to remain in driving engagement while the spindle head 31 is moved up and down. A telescopic guard tube 73 provides constant protection from dirt for the sleeve 70 and the splined shaft of the pinion 71 regardless of the position of the spindle head 31 on the column 21.

The bevel gear 72 is keyed to a spindle driving sleeve 74 which is rotatably supported by two bearings 75 and 76, mounted in the spindle head 31. The sleeve 74 passes through the center of a flexible coupling 77 which is keyed to the sleeve to rotate with it. At its periphery, the flexible coupling 77 is attached to a flywheel 78, which in turn is fastened to the spindle 32. The spindle 32 is journalled in two bearings 79 and 80 supported by the spindle head 31 and is provided at its forward end with a tool receiving socket 81. The tool 28 is retained in place by a nut 82 which is in threaded engagement with the spindle 32.

The flexible coupling 77 is provided to absorb shock and vibration which might otherwise be transmitted to the tool from the power train as the machine is operating, thus permitting the tool 28 to operate smoothly without chattering. The coupling is comprised of a metal sleeve 83 and a toroidal flexible tube 84 of rubber or the like attached to the periphery of the sleeve 83, together with a metal band 85 secured to the periphery of the tube 84. The sleeve 83 is provided with a key slot for securing it to the sleeve 74, and the metal band 85 is provided with a series of screw threaded openings receiving screws 86 for fastening the coupling to the flywheel 78. The tube 84 is provided with an opening 87 for receiving a valve (not shown), through which the core of the tube 84 is filled with a fluid, either liquid or gas, to any predetermined pressure depending upon the degree of rigidity which is desired in the flexible coupling 77.

The shaft 69 which furnishes power from the fixed step transmission 35 to the spindle head 31, also provides a source of power for moving the saddle 22 in synchronism with the spindle 32. As shown in Fig. 2, a worm 92 formed integrally with the shaft 69 engages a worm wheel 93. As illustrated in Fig. 3, the worm wheel 93 is rotatably mounted on a horizontal shaft 94 with a pair of overrunning or one-way clutches 95 and 96 attached to its sides, respectively. The one-way clutch 95 is arranged to drive in one direction and slip in the other, while the one-way clutch 96 is conversely arranged to oppositely drive in the direction in which the clutch 95 slips, and to slip in the direction in which the clutch 95 drives. The one-way clutch 96 is in driving engagement with the shaft 94 to rotate it directly when the worm wheel 93 is rotating in the driving direction of the clutch. When the worm wheel 93 is rotating in the opposite direction, the one-way clutch 95 functions to drive the shaft 94 through a reversing mechanism 97. The reversing mechanism is comprised of a bevel gear 98 fixed to the one-way clutch 95 and having driving connection with a bevel gear 99 through an intermediate idler gear 101, the bevel gear 99 being keyed to the shaft 94. This arrangement enables the shaft 94 to be constantly driven in a single direction irrespective of the direction of rotation of the shaft 69, thus permitting the spindle drive to be reversed without affecting the direction of movement of the saddle 22.

Power for moving the saddle 22 is transmitted from the unidirectional shaft 94 through a fixed step transmission 102 to a shaft 103. The series of speeds available in the fixed step transmission 102 are obtained by shifting a set of gear couplets 104, 105 and 106, engaged with a set of shifting forks 107, 108 and 109, respectively, as shown in Fig. 4, by manipulating a hand crank 110. A pointer 111 is fixed to the hand crank 110 to cooperate with a graduated dial 112 to indicate the rate of feed of the saddle 22 in terms of inches of feed per revolution of the spindle.

Included in the gear couplet 106, is a wide faced gear 113 engaging a spur gear 114, which meshes with a spur gear 115. The spur gear 115 is arranged to drive a shaft 116 through a torque limiting slip clutch 117, comprised of a collar 118 with flanges 119 at each end having a series of indentations 120 formed on their inner faces for receiving complementary balls 121 held in position by a set of cooperating springs 122. The gear 115 is rotatably mounted on the collar 118 and has a series of holes 123 drilled in its hub for containing the balls 121 and the springs 122. The collar 118 is keyed to the shaft 116 to permit the gear 115 to drive the shaft 116 through the balls 121 and the collar 118. The springs 122 exert a predetermined pressure outwardly upon the balls 121 sufficient to retain the balls in the indentations while transmitting power under normal conditions. However, if an overload condition occurs, the resulting torque is sufficient to overcome the pressure of the springs 122, permitting the gear 115 to rotate free of the collar 118, and thus disconnecting the shaft 116 from the source of power to preclude any possible damage to the machine.

Figure 6:
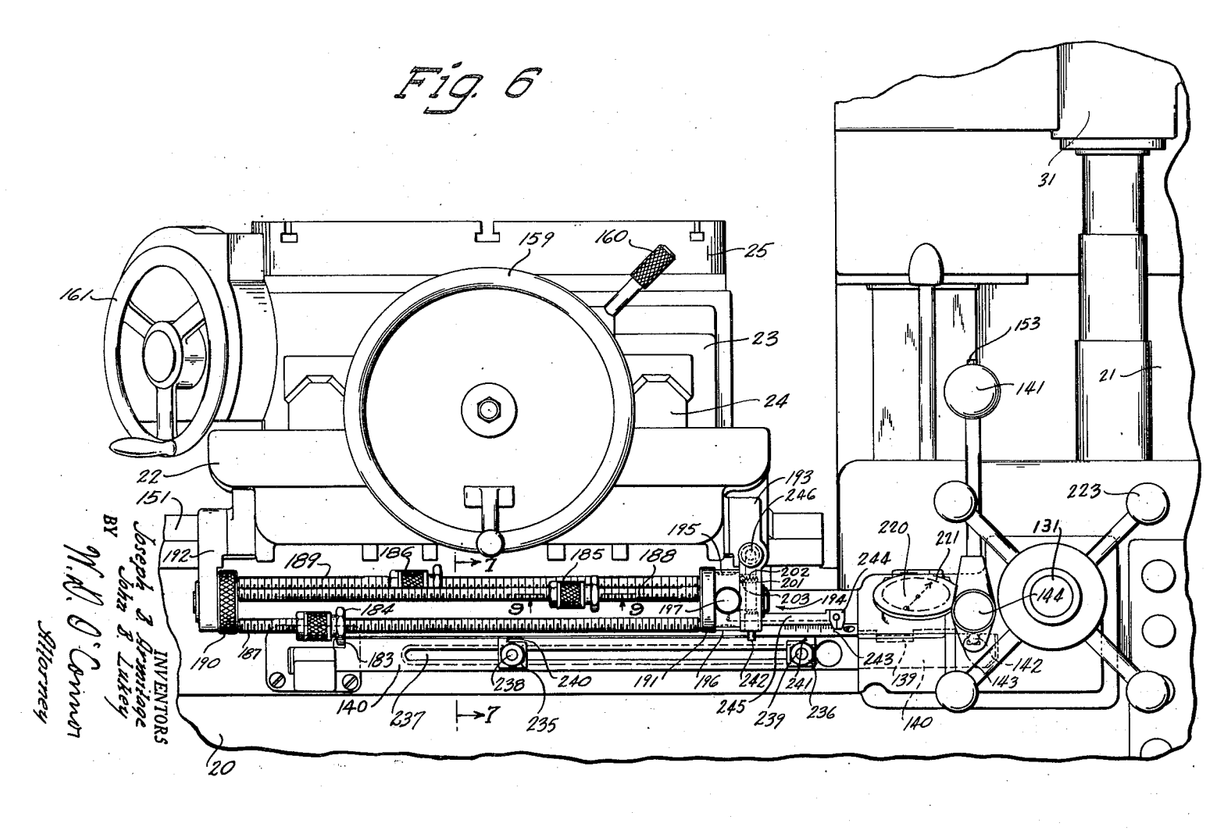
Fig. 6 is an enlarged detailed fragmentary view in front elevation of the indicating apparatus and part of the supporting machine structure shown in Fig. 1.

The shaft 116 transmits the power to a reversing mechanism 128 comprised of a bevel gear 129 carried by the shaft 116 to rotate relative to it, a bevel gear 130 keyed to a hand feed shaft 131 and an intermeshing bevel gear 132 keyed to a saddle feed screw 133, a clutch 134 being slidably keyed to the shaft 116 between the two bevel gears 129 and 130. The clutch 134 is engaged by a shifter fork 135 secured to a shifter rod 136. A slot 137 is formed in the end of the shifter rod 136 for receiving one end of a bell crank 138, the other end of the bell crank engaging a slot 139 in a trip bar 140, as shown in Fig. 6. The trip bar 140 is connected to a control lever 141 by means of a pin 142 carried at the end of the control lever 141 and engaging a slot 143 formed near the end of the trip bar. The control lever 141 is pivoted on a pin 144 for movement in either direction. When the lever 141 is moved, it actuates the trip bar 140 causing the bell crank 138 to pivot about a pin 145 and actuate the shifter rod 136 and its cooperating fork 135 to force the clutch 134 into engagement with either the bevel gear 129 or the bevel gear 130, depending upon the direction in which the control lever 141 is moved. The clutch 134 is provided with two sets of clutch teeth 146 and 147 for engagement with cooperating clutch teeth 148 and 149 formed on the bevel gears 130 and 129, respectively. As illustrated in Fig. 2, the bevel gear 132 is fixed to rotate the saddle feed screw 133 supported in the bed of the machine and having threaded engagement with a nut 150 fixed to the saddle 22. As the screw 133 is rotated in the nut 150, the saddle is forced to move along its cooperating ways 151 toward or from the column 21.

A separate motor 152, shown in Fig. 4, is provided for effecting rapid traverse movement of the saddle 22. A button 153 located on the top of the control lever 141 (Fig. 6) actuates a switch (not shown) to energize the motor 152. A gear 154 keyed to the end of a shaft 155 extending from the motor, engages an internal gear 156 mounted on the end of a shaft 157, which carries the gear 114 at its other end. When the motor 152 is energized, the gear 114 rotates the gear 115 at a high speed to cause the saddle to travel rapidly in its path of movement. The gear 114 is also in engagement with the gear 113 for transmitting power under feed rate conditions, and if power from the rapid traverse motor 152 were transmitted to the gear couplet 106, the entire transmission would operate at high speed, resulting in undue wear and damage to the machine. In order to obviate this, the gear 113 is connected to the gear couplet 106 by means of an overrunning clutch 158. The overrunning clutch 158 effects a driving connection between the gear couplet 106 and the gear 113 until the gear 113 is operated at a high speed when the clutch 158 releases and permits the gear 113 to operate free of or overrun the gear couplet 106. Power from the rapid traverse motor is then transmitted directly to the saddle 22 without affecting the other parts of the transmission.

Transverse movement of the carriage 23 along the ways 24 is accomplished by manipulating a hand wheel 159, and the carriage may be clamped in any selected position by manipulating a clamping lever 160. The rotary table 25 supported by the carriage 23 may be selectively rotated by turning a hand wheel 161 to actuate a gear train (not shown) which engages a ring gear 162 (Fig. 2) secured to the bottom surface of the rotary table 25.

After the table 25 has been positioned, it may be clamped to the carriage 23 by actuating a clamping lever 163 which serves to rotate a shaft 164, as shown in Fig. 2. The shaft 164 is in threaded engagement with a nut 165 which is slidable in the bore 166, but is prevented from rotating by serrated engagement with a collar 167 fixed to the carriage 23 by a screw 168. The shaft 164 is provided with an enlarged portion 169 at its opposite end for abutting a sleeve 170 carried by the shaft 164. As the shaft is rotated, it draws the sleeve 170 inward until it strikes a rocker 171 at an abutment 172, causing the rocker 171 to pivot about a pin 173 and force a clamping surface 174 of the rocker 171 against the ring gear 162. As the clamping action of the rocker 171 builds up a resistance to further movement of the sleeve 170, the nut 165 is urged toward the center of the table 25, forcing an abutting sleeve 175 with it. The sleeve 175, in turn, strikes a rocker 176 at an abutment 177, causing the rocker 176 to pivot about a pin 178 and force its clamping surface 179 against the ring gear 162. As the shaft 164 is turned further, the clamping effort of the rockers 171 and 176 against the ring gear 162 is increased by equal amounts for each rocker until the rotary table 25 is finally locked in position with equalized clamping pressure.

For limiting the extent of power movement of the saddle 22 automatically, a tripping mechanism illustrated in Fig. 6 is provided, which operates to disengage the motion interrupting clutch by actuating the feed control lever 141 when the saddle arrives at a predetermined position. As shown, the trip bar 140 is cut away at its left end to form an abutment 183 disposed for contact by one of a set of stop nuts 184, 185 and 186, as the saddle 22 travels toward the column in its path of movement. The stop nuts are adjustably carried respectively by corresponding screws 187, 188 and 189 supported at their ends by a pair of rotatable barrels 190 and 191, the screws being disposed horizontally between the barrels with the ends of the screws fitting into holes accurately spaced in a circle near the periphery of each barrel. The embodiment of the invention described in this disclosure utilizes three screws with their associated stop nuts, but any number of screws and nuts may be provided depending upon the number of positions in which it may be desired to stop the saddle 22 automatically for one setup of the machine. The barrels 190 and 191 are rotatably supported by brackets 192 and 193, respectively, fixed to the side of the saddle 22.

Figures 7, 8, 9, 10, 11, 12:
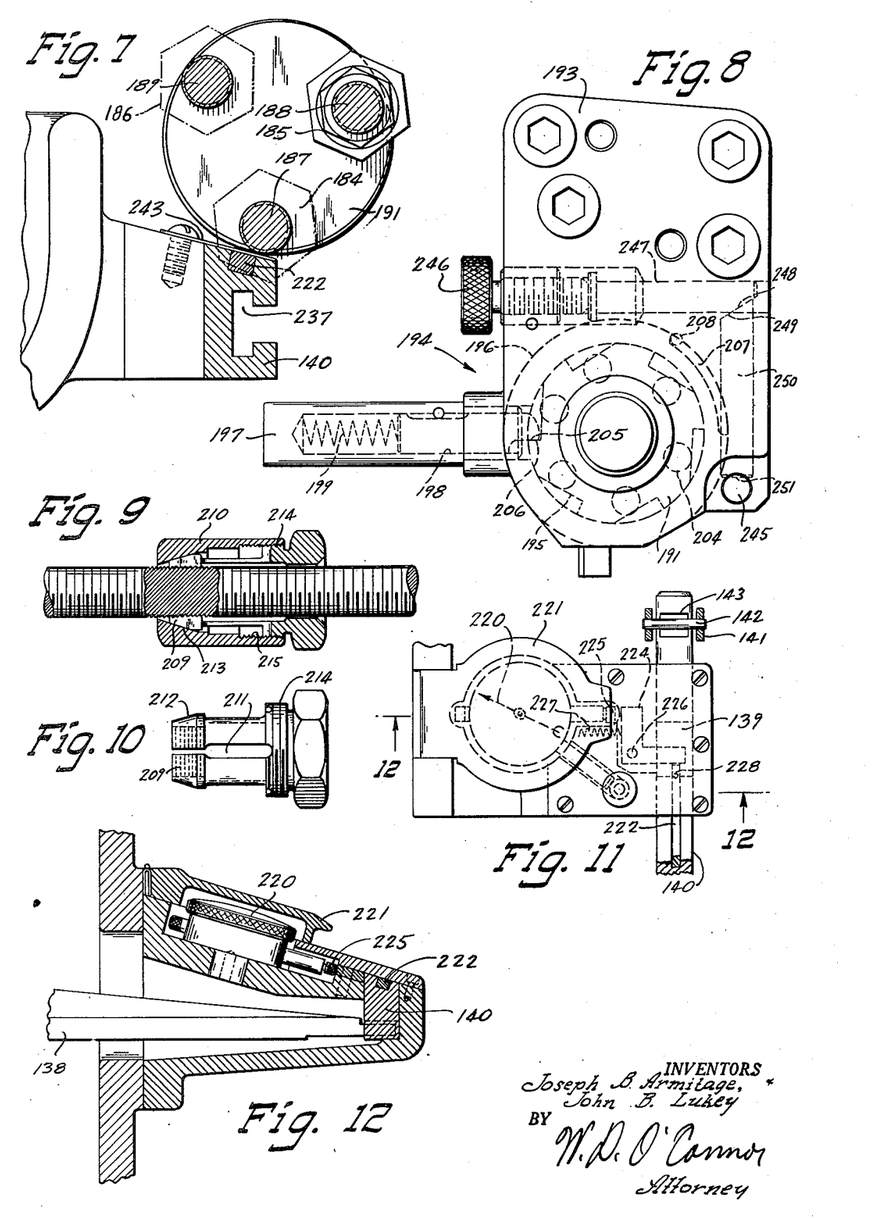

A ratchet device generally denoted by the numeral 194 and shown in detail in Fig. 8, is provided to cooperate with the right barrel 191 for the purpose of indexing it and its associated stop nut mechanism. A series of notches 195 are formed in the periphery of the barrel 191 which functions as a ratchet wheel. The number of notches provided depends upon the number of stops desired, in this instance there being six notches, three notches providing positions for each of the three screws and the alternate notches providing neutral intermediate positions in which none of the screws will be in operating position. A positioning ring 196 fits over the barrel 191 covering the notches 195, and extending radially from it is a hollow handle 197 which forms a housing for a pawl or ratchet 198 and a spring 199 which exerts pressure on the pawl to force it into engagement with one or another of the ratchet notches 195. A detent device is provided for retaining the barrel 191 in any one of its six positions. To this end, a hole 201 is drilled horizontally in the bracket 193 for containing a spring 202 and ball 203, as shown in dotted lines in Fig. 6. Six indentations 204 (Fig. 8) are formed in the back face of the barrel 191 corresponding to the six notches formed in its periphery and serve successively to receive the ball 203 as it is forced outwardly by the pressure of the spring 202. As one of the indentations 204 registers with the ball 203, the latter is forced into the indentation to hold the barrel 191 and its associated mechanism in position until sufficient force is exerted on the barrel by the pawl 198 to overcome the spring pressure holding the ball in the indentation.

To index the barrel 191, the handle 197 containing the pawl 198 is moved downwardly until the detent ball 203 registers with the next indentation 204. The barrel will revolve as the handle is moved downward because the flat surface 205 of the pawl 198 will then be in abutment with the flat surface 206 of one of the notches 195. After moving the barrel 191 to its new position, the handle 197 is moved upwardly until the pawl engages the next notch. The barrel 191 will not revolve when the handle is moved upwardly because the pawl 198 slips over the inclined faces of the notches 195 in the barrel while the pawl 198 is forced into the handle as the spring 199 is compressed. To limit the rotative movement of the positioning ring 196, a groove 207 is formed in its outer periphery while a pin 208 fixed to the bracket 193 rides within the groove. When either end of the groove 207 strikes the pin 208, the position ring is precluded from moving any further, its range of movement being thus delimited.

The stop nuts 184, 185 and 186 are each provided with an adjustable internally threaded neck 209 that may be expanded for facilitating the movement of the nuts along the length of the screws 187, 188 and 189. An encircling sleeve 210, shown in Fig. 9, is used for adjusting the thread. The neck part 209 of the nuts 184, 185 and 186 in which the adjustable screw engaging thread is formed, is split into a number of sections by the axial cuts 211, as shown in Fig. 10, and its diameter is expanded fully to allow the internal thread to pass over the thread of its mating screw without engagement. A tapered surface 212 is formed on the outer diameter of the threaded neck 209 of the nut for engagement with a complementary tapered surface 213 on the inside of the sleeve 210. The nut is provided with an external second thread 214 for engagement with an internal thread 215 formed in the end of the sleeve 210 opposite the tapered end thereof. As the sleeve 210 is threaded onto the nut, its tapered surface 213 contacts the tapered surface 212 of the nut and forces its associated threaded neck 209 into engagement with the thread of its mating screw. As the sleeve 210 is forced further onto the nut, the contraction of the threaded neck 209 continues proportionately and gradually reduces the clearance between the two threads; this results in a progressively tighter fit therebetween until finally the two threads lock, thereby precluding any further movement of the nut along the screw. As the sleeve 210 is backed off the nut and its tapered surface 213 moves away from the tapered surface 212 of the nut, the threaded neck 209 gradually expands until it assumes its normal open position whereat the stop nut can be slidably passed over the screw without engagement between the threads.

To set the tripping mechanism for stopping the saddle at a predetermined position, any one of the stop nuts may be suitably positioned on its mating screw. For example, the stop nut 184 is positioned on the screw 187 and then locked in place by tightening the sleeve 210 on the nut, the screw being indexed to its operating position by manipulating the ratchet device 194. To initiate power movement of the saddle 22, the feed control lever 141 is moved to the right from the positions shown in Figs. 1 and 6, causing the saddle to travel under power toward the column at the rate established by manipulating the rate selecting hand crank 110 such movement will continue until the stop nut 184 strikes the abutment 183, forcing the trip bar 140 with it and, consequently, moving the feed control lever 141 to the left. The feed control lever is equipped with a detent device (not shown) which urges the lever into neutral after it has been moved through a portion of the arc toward the neutral position. After the feed control lever has been moved the required amount by the stop nut 184 acting through the trip bar 140, the detent device takes over to move the lever the balance of the way to a neutral or vertical position and incidentally advances the trip bar, withdrawing the abutment 183 from contact with the stop nut.

The above described tripping mechanism is designed to achieve a high degree of accuracy in consistently stopping the saddle at a predetermined position, but the inertial forces existing in the saddle moving mechanism vary with the different rates of feeding movement and likewise other factors such as the frictional forces and the cutting forces of the boring tool vary under different conditions of operation so that the position at which saddle 22 will stop in relation to the tripping point when the power connection to the saddle driving mechanism is interrupted automatically by the trip mechanism will not be exactly the same each time the tripping operation occurs. Accordingly, in order to obtain exact positioning of the saddle 22 after it is stopped upon operation of the trip mechanism, as aforedescribed, the saddle is moved manually to its final terminal position under the guidance of an auxiliary sensitive precision indicator mechanism that functions to indicate accurately the position of the saddle at the end of its path of travel in the feeding movement.

As shown in the drawing, the particular position indicating apparatus there illustrated in the preferred embodiment of the invention, includes a sensitive precision indicating device or dial indicator 220 which may be of any well known commercial type. As shown in Fig. 6, the indicator 220 is disposed at the side of the column at the right end of the trip mechanism and is protected by a hinged lid 221. The indicator is operatively connected by motion transmitting mechanism to indicate accurately the predetermined terminal position of the saddle 22 at the end of its feeding movement. When the saddle 22 is in the region of the predetermined terminus, the indicator 220 may be actuated by any one of the stop nuts 184, 185 or 186, depending upon which one is in the operating position, but only after the stop nut has contacted the abutment 183 of the trip bar 140 and has moved the bar to interrupt the power movement of the saddle.

The stop nuts 184, 185 and 186 are arranged to cooperate with an indicator actuating rod 222 which is slidably carried in a groove formed in the upper edge of the trip bar 140, as shown in Figs. 11 and 12. The trip bar 140 and indicator actuating rod 222 are so arranged that when the saddle 22 is in its power feeding movement traveling toward the column, the trip bar 140 is operatively positioned for engagement with the stop nut, having been forced in that direction when the feed control lever 141 was initially manipulated to institute power feeding movement of the saddle. The indicator actuating rod 222 on the other hand, is only sufficiently movable to actuate the indicator pointer through its prescribed range of operation, which in this instance is approximately .015 inches, accordingly when the rod 140 is moved to the left the rod 222 remains substantially stationary and is completely retained in the longitudinal groove in the rod 140.

The stop nut therefor does not strike the indicator actuating rod 222 when it is functioning to stop the power movement because the final movement of the trip bar to the right is completed by the action of the detent device in the feed control lever, as previously mentioned. Only after movement of the trip bar 140 to the right has been completed, is the end of the indicator actuating rod 222 exposed for engagement with the stop nut. The final movement of the saddle 22 to its predetermined position is then completed manually by manipulating a hand wheel 223 mounted on the extending end of shaft 131. As the saddle is moved inwardly, the stop nut abuts against the exposed end of the indicator actuating rod and moves it to the right. The opposite end of the indicator actuating rod 222 abuts one end of a bell crank 224, Fig. 11, the other end of which abuts an indicator plunger 225 disposed to actuate the pointer of the dial indicator 220. As the indicator actuating rod is forced to the right, it causes the bell crank 224 to pivot about its fulcrum 226 and actuate the indicator 220. A spring 227 is disposed to continuously exert pressure on the bell crank 224 to force it away from the indicator plunger 225 and against the indicator actuating rod 222, causing the latter to remain in its outermost position unless a counteracting force is applied to overcome the pressure of the spring 227. The indicator actuating rod is limited in its longitudinal movement by a pin 228 which is secured to the indicator bracket and inserted in a slot formed in the indicator actuating rod 222.

In performing a machining operation, such for instance as boring three holes 232, 233 and 234 of different predetermined depths in the workpiece 26 (see Fig. 1), the depth of each hole may be established accurately and readily at a predetermined position by means of the precision indicating mechanism. For example, the sleeve 210 of the stop nut 184 is turned away from the nut to permit complete expansion of the threaded neck 209. The nut then may be slid along the screw 187 until it is set at approximately the proper location for the boring of the hole 234. The sleeve 210 is then turned to contract the threaded neck 209 of the nut 184 until it engages the thread of the screw 187 but does not lock it in place. A final adjustment along the screw 187 corresponding to the depth of the hole 234, is then accomplished by rotating the nut 184 along the thread of the screw, whereupon the sleeve 210 is tightened on the nut, locking the nut in place. The remaining stop nuts 185 and 186 are adjusted in the same manner to the desired positions along the screws 188 and 189, respectively, depending upon the positions in which it is desired to stop the saddle 22 corresponding to the depths of the holes being bored.

Assuming that the holes are in a vertical line and it is desired to first bore the bottom hole 234, the spindle 32 is moved to the proper height by manipulating the hand wheel 33 and the workpiece is adjusted transversely into proper alignment with the spindle by manipulating the hand wheel 159 which actuates the carriage 23 horizontally. The workpiece 26 is then fed to the boring tool 28 by power feeding movement of the saddle 22 at a predetermined feed rate in a forward direction until the cooperating stop nut 184 engages the trip bar 140 thereby disconnecting the power drive, the apparatus being so adjusted that the saddle stops at a position near to but somewhat short of the predetermined terminal position. The feeding movement of the saddle 22 may then be continued manually by manipulating the hand wheel 223, the stop nut 184 meanwhile coming into engagement with the end of the indicator actuating rod 222 to actuate the pointer of the dial indicator 220 from which the precise position of the saddle 22 may be determined.

The saddle is then moved outwardly to withdraw the workpiece from the tool 28 and the spindle is moved upward until it is in proper alignment for boring the hole 233. The succeeding stop nut 186, which has been set on the screw 189 to position the saddle 22 for the boring of hole 233, is then brought into operating position by manipulating the ratchet device 194. The power source is again engaged to move the workpiece forward in the feeding movement and the positioning mechanism functions in the same manner as was described for the boring of hole 234. The process is then repeated for the completion of the third hole 232 and the entire cycle may be repeated indefinitely upon a succession of workpieces without further adjustment once the stop nuts have been properly positioned and clamped on the screw.

The above described mechanism provides for precisely positioning the saddle 22 at the terminus of its inwardly feeding movement only, no provision being made for automatically interrupting the power connection and positioning the saddle when it is moving away from the cutting tool, although the mechanism could be rearranged to effect correspondingly precise positioning during outwardly directional saddle movement.

A supplemental or secondary positioning control device of lesser accuracy is provided for automatically disengaging the power train and positioning the saddle when it is traveling in either direction for use where only approximate positioning is required. The final manual adjustment may be determined from a visual scale and pointer rather than the sensitive indicating device. Automatic stopping is achieved with the supplemental device through a pair of trip dogs 235 and 236 slidably mounted in a T-slot 237 formed in the side of the tripping bar 140, as best shown in Fig. 6; the slots also serve to retain a pair of T-bolts 238 and 239, used to secure the trip dogs in any desired position along the length of the slot. The trip dogs 235 and 236 are provided with abutment surfaces 240 and 241, respectively, for engagement with a trip pin 242 fixed to and depending from the bracket 193 to move with the saddle 22. The feed control lever 141 is moved to the right of the position shown in Figs. 1 and 6, to initiate power movement of the saddle 22 inward toward the cutter, as previously mentioned. The saddle will continue its inwardly movement under power until the trip pin 242 strikes the abutment 241 on the trip dog 236, forcing the trip bar 140 to the right to move the feed control lever to the vertical or neutral position, disengaging the clutch and stopping the movement of the saddle, as previously explained. To initiate an outward movement of the saddle 22, the feed control lever is moved to the left of the position shown in Figs. 1 and 6, whereupon the saddle will continue its power movement in the outward direction until the trip pin 242 strikes the abutment 240 on the trip dog 235 to move the trip bar 140 with it and shift the feed control lever 141 to its neutral position, interrupting the power movement of the saddle.

Final adjustment of the saddle is accomplished by manipulating the hand wheel 223 with the saddle position being determined from a graduated scale 243 mounted over the trip bar 140, as shown in Figs. 6 and 7; the scale 243 also serves as a retainer for the indicator actuating rod 222 which it covers throughout its entire length. A pointer 244 is carried by a rod 245 which is releasably mounted on the bracket 193 to move with the saddle 22 and disposed to cooperate with the graduated scale 243. As indicated in Fig. 6, the point 244 is adjustable longitudinally to facilitate reading of the scale. For the initial reading, the pointer may be slid along the scale until it is opposite a unitary value in order to eliminate computations from a fraction of a unit, and then locked in place. To lock the pointer in position, a clamping mechanism is provided including a lock screw 246 in threaded engagement with the bracket 193. When the lock screw 246 is turned to the right (see Figs. 6 and 8), it exerts pressure on a horizontally disposed lock pin 247 which has an angular surface 248 disposed for engagement with a complementary angular surface 249 formed on the upper end of a vertically disposed lock pin 250 to force it downwardly. The lower end of the lock pin 250 bears on a flattened surface 251 of the pointer carrying rod 245 and as the lock pin 250 is forced downward, it locks the rod 245 and its associated pointer 244 in place.

From the foregoing detailed description of a practical working embodiment of the invention, it is apparent that there has been provided a useful and convenient power transmitting mechanism as well as an indicating mechanism for precisely positioning a movable element of a machine tool at a predetermined terminal point delimiting the end of a definitely defined path of movement.

Although but a single embodiment of the invention has been set forth in considerable detail to constitute a full disclosure, it is to be understood that persons skilled in the art may utilize the novel principles here taught in apparatus differing in construction from the particular mechanism herein described without departing from the spirit and scope of the invention, as defined in the subjoined claims.

The principles of the invention having now been fully explained in connection with the foregoing description of embodying structure, we hereby claim as our invention:

1. In a machine tool, the combination of a fixed support, a movable member carried by said fixed support, means engageable for moving said member by power in either direction selectively, a precision positioning control device comprising a trip bar slidably mounted on said fixed support and operatively connected to disengage said power means, a plurality of tripping elements movable selectively into operating position where they abut against said trip bar as said movable member travels in its path of movement to actuate said trip bar and disengage said power means for accurate positioning of said movable member a secondary positioning control device comprising, a pair of trip dogs adjustably secured to said trip bar, and a trip pin fixed to said movable member and disposed to engage said trip dogs as said movable member travels in its path of movement in either direction to move said trip bar and disengage said power means; an indicator actuating element disposed to be moved by said tripping elements during the operation of said secondary positioning control device after said power means is disengaged, a sensitive indicating device disposed to respond to movements of said indicator actuating element to indicate precisely the position of said movable member, a visual scale mounted on said fixed support, and a pointer carried by said movable member to cooperate with said visual scale for indicating the approximate position of said movable member.

2. In a machine tool, the combination of a fixed support, a movable element carried by said fixed support, means engageable for driving said movable element by power in either direction selectively, a cutting tool, a trip bar operatively connected to disengage said power means for accurate positioning of said movable element, a plurality of tripping elements adjustably mounted along the side of said movable element and disposed to abut against said trip bar selectively at any predetermined position in the path of movement of said movable element to actuate said trip bar and disengage said power means, an indicator actuating element, a sensitive indicating device disposed to respond to movements of said indicator actuating element to indicate the precise position of said movable element in relation to said cutting tool; a supplemental positioning control device for effecting approximate positioning of said movable element in either direction of movement comprising a pair of trip dogs adjustably mounted along the length of said trip bar, a trip pin secured to said movable element and disposed to abut against either of said trip dogs as said movable element travels in its path of movement to actuate said trip bar and disengage said power means to stop the movement of said movable element at any predetermined position in its path of movement, a graduated scale carried by said fixed support, a pointer slidably mounted on said movable element and disposed to cooperate with said graduated scale to indicate the approximate position of the movable element in relation to said cutting tool.

3. In a machine tool, in combination, a supporting structure, a member movably mounted on said supporting structure, means engageable for driving said movable member by power in either direction selectively, a trip bar slidably mounted on said supporting structure and operatively connected to disengage said power means, a pair of barrels rotatably supported on said movable member, a plurality of rods supported between said barrels, a tripping element carried by each of said rods and movable along its axis, an indexing device attached to one of said barrels for setting any one or none of said tripping elements in operating position to engage said trip bar at any predetermined position in its path of movement and automatically disengage said power means, an indicator actuating element disposed to be moved by said same tripping element after having functioned to move said trip bar and disengage said power means, a sensitive indicating device arranged to respond to movements of said indicator actuating element to indicate precisely the position of said movable member in relation to the cutting tool, and means for moving said movable member manually to the precise predetermined position as indicated on said sensitive indicating device after the said power means has been disengaged.

4. In positioning mechanism for a movable element of a machine tool, means arranged to effect power feeding movement of said element, tripping mechanism operative to disengage said power feeding means, a trip bar operatively connected to actuate said tripping mechanism, a sensitive indicating instrument disposed to indicate the position of said movable element, an indicator actuating rod slidably mounted on said trip bar and operatively connected to actuate said instrument, and a stop nut mechanism carried by said movable element for cooperating engagement with said trip bar and said actuator rod, whereby initial engagement with said trip bar serves to disengage said power feeding means and engagement with said actuator rod serves to actuate said position indicating instrument.

5. In a machine tool having a movable carriage, power driven feeding means selectively connectible to effect feeding movement of said carriage, tripping mechanism including a longitudinally movable trip bar arranged for initial movement in connecting or disconnecting said power driven feeding means, a sensitive dial indicator disposed to indicate the position of said movable carriage, an indicator actuating rod slidably mounted for limited longitudinal movement on said trip bar and operatively connected to actuate said dial indicator, an adjustable stop carried by said movable carriage, an abutment on said trip bar disposed to be engaged by said adjustable stop in the course of movement of said carriage, the arrangement being such that said trip bar is thereby initially moved to disconnect said power driven feeding means, and an abutment on said indicator actuating rod arranged to be exposed for engagement by said stop after said trip bar has initially moved, whereby said carriage may be stopped automatically at it approaches a predetermined position and then advanced to the predetermined precise position under guidance of said sensitive dial indicator.

6. In a machine tool having a base, a movable element slidably mounted on said base, a power drive means disposed to effect movement of said element on said base in either direction selectively, a trip bar operatively connected to engage and disengage said power drive means, a precision positioning control device including a plurality of control screws indexably positionable on said movable element, a stop nut for each of said screws selectively positionable to engage said trip bar at a predetermined point of travel of said movable element to disengage said power drive, an indicator actuating rod slidably mounted on said trip bar and disposed to be engaged by the same position determining stop nut after the power drive to said movable element has been disengaged, a sensitive indicating device disposed to respond to longitudinal movement of said actuating rod to precisely indicate the position of said movable element on said base; a secondary positioning control device including a pair of trip dogs selectively positionable on said trip bar to define the limits of travel of said movable element, a trip pin fixedly disposed on said movable element to engage said trip dogs and to actuate said trip bar and disengage said power drive means, a visual scale fixedly mounted on said trip bar for movement therewith, and a pointer carried by said movable element to cooperate with said scale and indicate the approximate position of said movable element, whereby either of said positioning control devices may be utilized to interrupt the power drive to said movable element and to indicate the position thereof.

7. In a positioning mechanism for a machine tool having a base and a movable member mounted on said base, a power driven transmission operably connected to effect movement of said movable member, tripping mechanism operatively disposed to disengage said transmission drive, a trip bar operatively connected to actuate said tripping mechanism, an indexible positioning means mounted on said movable member and presenting a plurality of threaded rods each having an expansible stop nut selectively positionable thereon, a sensitive position indicator disposed to indicate the position of said movable member, and an indicator actuating rod slidably mounted for longitudinal movement in a plane corresponding with that of the trip bar and operatively connected to actuate said sensitive position indicator, whereby the initial engagement of said stop nut with said trip bar serves to disengage said power feeding means while the subsequent engagement of said stop nut with said actuator rod serves to operate said sensitive position indicator to precisely indicate the position of said movable member.

8. A positioning mechanism for a movable machine member comprising a primary positioning control device including a trip bar operatively connected to effectively disconnect the power drive for said movable member, a plurality of tripping elements selectively movable into operating position to engage said trip bar as said movable member travels in its path of movement, a secondary position control device including a pair of trip dogs adjustably secured to said trip bar and a trip pin fixedly carried by said movable member and disposed to engage said trip dogs at predetermined points of member travel in either direction to move said trip bar and disconnect the power drive for said movable member, whereby either of said positioning control devices may be utilized for interrupting the power drive to said movable member and to effect selective positioning thereof.

9. In a machine tool, a base, a movable member slidably mounted on said base, power drive means selectively controllable for moving said member in either direction, a precision positioning control device operatively disposed on said base and including a trip bar slidably mounted to disengage said power means, a plurality of tripping elements adjustably mounted on said movable member in the plane of movement thereof and disposed to abut against said trip bar selectively at any predetermined point of member movement to effect disengagement of said power drive means, a sensitive indicating device, an indicator actuating means operatively connected to said indicating device and disposed on said base for subsequent engagement by one of said tripping elements to indicate the precise position of said movable member, a secondary positioning control device for effecting approximate positioning of said movable member comprising a pair of trip dogs adjustably mounted on said trip bar, a trip pin fixedly disposed on said movable member to abut against said adjustable trip dogs at predetermined points of member travel to actuate said trip bar and disengage said power drive means, a position indicating scale and associated pointer relatively disposed on said base and said movable member to indicate the approximate position of said movable member, whereby said first mentioned position control device may be utilized to effect precise positioning of said movable member and said secondary positioning control device may be utilized to effect approximate positioning of said movable member.

References Cited in the file of this patent

UNITED STATES PATENTS

| Number | Name | Date |
| --- | --- | --- |
| Re. 21,795 | Verderber | May 6, 1941 |
| 750,675 | Michelin | Jan. 26, 1904 |
| 1,140,594 | Howe | May 25, 1915 |
| 1,256,790 | Hallenbeck | Feb. 19, 1918 |
| 1,516,734 | Johnson | Nov. 25, 1924 |
| 1,968,276 | Armitage | July 31, 1934 |
| 2,049,133 | Peirce | July 28, 1936 |
| 2,110,537 | Tautz | Mar. 8, 1938 |
| 2,244,413 | Armitage | June 3, 1941 |
| 2,310,720 | Wandrey | Feb. 9, 1943 |
| 2,350,685 | Kasdan | June 6, 1944 |
| 2,391,398 | De Vlieg | Dec. 25, 1945 |
| 2,483,712 | Schafer | Oct. 4, 1949 |